United States Patent
Blas et al.

(10) Patent No.: US 8,938,668 B2
(45) Date of Patent: Jan. 20, 2015

(54) VALIDATION BASED ON DECENTRALIZED SCHEMAS

(75) Inventors: Andrea Di Blas, San Francisco, CA (US); Ravi Murthy, Saratoga, CA (US); Mayssam Sayyadian, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/221,832

(22) Filed: Aug. 30, 2011

(65) Prior Publication Data
US 2013/0055065 A1    Feb. 28, 2013

(51) Int. Cl.
G06F 17/00 (2006.01)
G06F 17/27 (2006.01)
G06F 17/22 (2006.01)

(52) U.S. Cl.
CPC ........ *G06F 17/2247* (2013.01); *G06F 17/2725* (2013.01)
USPC ........................................................ 715/234

(58) Field of Classification Search
USPC .......................................... 715/200, 234, 255
See application file for complete search history.

(56) References Cited

U.S. PATENT DOCUMENTS

| | | | | |
|---|---|---|---|---|
| 5,434,962 A * | 7/1995 | Kyojima et al. | ............... | 715/234 |
| 6,622,139 B1 * | 9/2003 | Nakayama et al. | ............ | 707/749 |
| 6,826,726 B2 * | 11/2004 | Hsing et al. | .................... | 715/234 |
| 7,051,016 B2 * | 5/2006 | Winkler | ............................... | 1/1 |
| 7,143,344 B2 * | 11/2006 | Parker et al. | ................... | 715/236 |
| 7,480,859 B2 * | 1/2009 | Mani et al. | ..................... | 715/234 |
| 7,493,305 B2 * | 2/2009 | Thusoo et al. | ......................... | 1/1 |
| 7,512,878 B2 * | 3/2009 | Shur et al. | ..................... | 715/234 |
| 7,707,492 B2 * | 4/2010 | Zaharkin | ........................ | 715/236 |
| 7,765,467 B2 * | 7/2010 | Malek et al. | .................. | 715/234 |
| 7,797,622 B2 * | 9/2010 | Dejean et al. | ................. | 715/231 |
| 7,810,024 B1 * | 10/2010 | Goldman | ....................... | 715/234 |
| 7,882,149 B2 * | 2/2011 | Foster et al. | .................. | 707/803 |
| 7,913,172 B2 * | 3/2011 | Rjaibi et al. | .................. | 715/741 |
| 8,117,533 B2 * | 2/2012 | Adler et al. | .................... | 715/234 |
| 8,176,563 B2 * | 5/2012 | Redlich et al. | .................. | 726/27 |
| 8,356,079 B2 * | 1/2013 | Basu et al. | ..................... | 709/216 |
| 8,566,096 B2 * | 10/2013 | Bangalore et al. | ............ | 704/251 |
| 8,661,332 B2 * | 2/2014 | Dunietz et al. | ................ | 715/234 |
| 8,850,309 B2 * | 9/2014 | Fablet et al. | .................. | 715/242 |
| 2002/0010715 A1 * | 1/2002 | Chinn et al. | ................... | 707/514 |
| 2002/0147747 A1 * | 10/2002 | Zaharkin | ....................... | 707/513 |
| 2003/0028557 A1 * | 2/2003 | Walker et al. | ................. | 707/500 |

(Continued)

OTHER PUBLICATIONS

Zhao et al., A Unifying Approach to Validatig Specification-Oriented XML Constraints, IEEE 2011, pp. 33-40.*

(Continued)

*Primary Examiner* — Cong-Lac Huynh
(74) *Attorney, Agent, or Firm* — Hickman Palermo Truong Becker Bingham Wong LLP

(57) ABSTRACT

Rules are collected for each structured element in a document. The rules that apply to any particular instance of an element depend on the hierarchical position of the instance within the document. The rules are collected and efficiently organized in a manner that accounts for this dependency. Once the rules are collected, the rules may be further processed. For example, there may be dependencies between calculations. The computation of the calculations is scheduled in a manner that accounts for these dependencies. Once the rules are collected and further processed, the rules are used to validate the given document.

24 Claims, 9 Drawing Sheets

(56) References Cited

U.S. PATENT DOCUMENTS

| | | | |
|---|---|---|---|
| 2003/0074636 A1* | 4/2003 | Manepalli | 715/513 |
| 2005/0076030 A1* | 4/2005 | Hada et al. | 707/9 |
| 2005/0246716 A1* | 11/2005 | Smith et al. | 719/315 |
| 2006/0004729 A1* | 1/2006 | Zhilyaev et al. | 707/3 |
| 2007/0250527 A1* | 10/2007 | Murthy et al. | 707/102 |
| 2009/0019358 A1* | 1/2009 | Blake et al. | 715/234 |
| 2009/0119316 A1* | 5/2009 | Bakker et al. | 707/100 |
| 2009/0129396 A1* | 5/2009 | Bakker et al. | 370/400 |
| 2009/0248431 A1* | 10/2009 | Schoknecht et al. | 705/1 |
| 2010/0030752 A1* | 2/2010 | Goldentouch | 707/3 |
| 2010/0049727 A1* | 2/2010 | Balegar et al. | 707/101 |
| 2011/0004820 A1* | 1/2011 | Kloiber et al. | 715/255 |
| 2011/0145783 A1* | 6/2011 | Seshan et al. | 717/105 |
| 2011/0173528 A1* | 7/2011 | Zunger | 715/234 |
| 2011/0213783 A1* | 9/2011 | Keith, Jr. | 707/741 |
| 2011/0276360 A1* | 11/2011 | Barth et al. | 705/7.23 |
| 2011/0289118 A1* | 11/2011 | Chen et al. | 707/803 |
| 2012/0323919 A1* | 12/2012 | Alba et al. | 707/738 |
| 2013/0007068 A1* | 1/2013 | Pitschke | 707/803 |
| 2013/0007070 A1* | 1/2013 | Pitschke | 707/803 |
| 2013/0086462 A1* | 4/2013 | De Cerqueira Gatti et al. | 715/222 |
| 2013/0219017 A1* | 8/2013 | Bakker et al. | 709/217 |
| 2014/0075285 A1 | 3/2014 | Blas et al. | |
| 2014/0237345 A1 | 8/2014 | Blas et al. | |

OTHER PUBLICATIONS

Lee et al., A Path Clustering based on Structural Similarity in XML, Google 2000, pp. 1-4.*
Boukottaya et al., Schema Matching for Transforming Structured Documents, ACM 2005, pp. 101-110.*
Simov et al., Constraints for Corpora Development and Validation, Google 2003, pp. 698-705.*
Gasch et al., memasysco: XML Schema based Metadata Management System for Speech Corpora, Google 2008, pp. 2865-2870.*
Dekeyser Stjin et al., "Conflict Scheduling of Transactions on XML Documents", dated 2004, 10 pages.
Oasis, "Oasis Content Assembly Mechanism Specification Version 1.1", Committee Specification Draft 02, dated Feb. 26, 2007, 62 pages.
Kathuria et al., IBM, XML Validation Framework Using OASIS CAM, dated May 11, 2010, 16 pages.
Carey et al., IBM, "Meet Cam: A New XML Validation Technology" dated Sep. 22, 2009, 10 pages.
Cam Content Assembly Mechanism, "Executive Overview", Oasis Business Transaction Information Management, 8 pages, dated Jul. 6, 2011.

* cited by examiner

FIG. 7

```
701  schedule()
702  {
703    for (each calculation calc)        /* init stage flags */
704      calc.stage = -1;
705
706    for (each calculation calc)
707      scheduleRec(calc);
708  }
709
710  scheduleRec(calc)        /* return highest stage found */
711  {
712    if (calc.stage < 0)
713    {
714      if (calc has no dependencies)
715      {
716        calc.stage = 0;
717        return(0);
718      }
719      for (each calc's dependency dep)
720      {
721        dep.stage = scheduleRec(dep);
722        if(dep.stage + 1 > calc.stage)
723          calc.stage = dep.stage + 1;
724      }
725      return(calc.stage);
726    }
727  }
```

VALIDATION BASED ON DECENTRALIZED SCHEMAS

CROSS-REFERENCE TO RELATED APPLICATIONS; BENEFIT CLAIM

This application is related to U.S. patent application Ser. No. 12/782,591, entitled TYPE SYSTEM FOR BUILDING EXTENSIBLE BUSINESS APPLICATIONS, filed on May 18, 2010 by Eric Sedlar, et al., incorporated herein by reference and referred to hereafter as the XAP patent application.

FIELD OF THE INVENTION

The present invention relates to validating documents marked by a mark-up language, such as XML.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The use of hierarchical mark-up languages for structuring and describing data is finding wide acceptance in the computer industry. An example of a mark-up language is XML.

Data structured using a hierarchical mark-up language is composed of nodes. Nodes are delimited by a pair of corresponding start and end tags, which not only delimit the node, but also specify the name of the node. For example, in the following structured data fragment, <A><B>5</B><D>10</D></A> the start tag <A> and the end tag </A> delimit a node having name A.

The data between the corresponding tags is referred to as the node's content. A node's content can either be a scalar value (e.g. integer, text string), or one or more other nodes. A node that contains only a scalar value is referred to herein as a scalar node. A node that contains another node is referred to herein as a structured node. The contained nodes are referred to herein as descendant nodes.

In addition to containing one or more nodes, a structured node's content may also include a scalar value. Such content in a node is referred to herein as mixed content.

A structured node thus forms a hierarchy of nodes with multiple levels, the structured node being at the top level. A node at each level is linked to one or more nodes at a different level. Each node at a level below the top level is a child node of a parent node at the level above the child node. Nodes having the same parent are sibling nodes. A parent node may have multiple child nodes. A node that has no parent node linked to it is a root node, and a node that has no child nodes linked to it is a leaf node. For example, in structured node A, node A is the root node at the top level. Nodes B and D are descendant and child nodes of A, and with respect to each other, nodes B and D are sibling nodes. Nodes B and D are also leaf nodes.

Schemas

A document is an arbitrary sequence of one or more structured nodes. Documents may be stored in various formats. For example, a document may be stored as a text file, or a document may be stored in an XML database in a Large Object (LOB) column of a row, or as a web page accessible as a resource on the Internet.

It is very important to create documents that conform to structures and constraints that computing devices are configured to handle. A document schema is a set of rules that constrain structure and content of documents. A document that conforms to a document schema is referred to herein as a valid document and as an instance of the document schema.

Generally speaking, a schema is a set of rules for structure and constraints for units of data. The term schema is used herein both to refer to a single schema, i.e. rules for a single type of unit of data, or to a collection of schemas, each defining a different type of unit of data. For example, the term schema may refer to multiple document schemas or to a single document schema.

Schemas and the rules therein can be expressed using schema declarations. Schema declarations are expressions that, according to a schema standard and/or language, define a schema rule.

A schema standard used for XML documents is XML Schema. Standards governing XML schemas include: XML Schema, Part 0, Part 1, Part 2, W3C Recommendation, 2 May 2001, the contents of which are incorporated herein by reference; XML Schema Part 1: Structures, Second Edition, W3C Recommendation 28 Oct. 2004, the contents of which are incorporated herein by reference; XML Schema 1.1 Part 2: Datatypes, W3C Working Draft 17 Feb. 2006, the contents of which are incorporated herein by reference; and XML Schema Part 2: Datatypes Second Edition, W3C Recommendation 28 Oct. 2004, the contents of which incorporated herein by reference. XML Schemas as described in this document are not restricted to W3C XML Schemas but include any other mechanisms for describing the structural and/or typing information of XML documents, for example, Relax NG.

XML Schema provides for a type of schema referred to herein as a document-centralized schema. In a document-centralized schema, a document schema is defined by a schema declaration that expressly declares to be a document schema.

Validation refers to the process of determining whether a document, or part thereof, conforms to a schema. A document, or part thereof, that has been determined to conform to a document schema is referred to herein as validated. Generally, validation mechanisms that have been developed are adept at validating document-centralized schemas. However, not all forms of schemas are document-centralized, such as the decentralized form described in the XAP patent application. Described herein are techniques that may be used to facilitate the process of validating document schemas that are decentralized.

Based on the foregoing, there is need for techniques and mechanisms for efficiently validating documents according to a decentralized document schema.

BRIEF DESCRIPTION OF THE DRAWINGS

In the drawings:

FIG. 7 is pseudo code describing an algorithm for partitioning calculations into stages according to an embodiment.

DETAILED DESCRIPTION

Figure 1A:
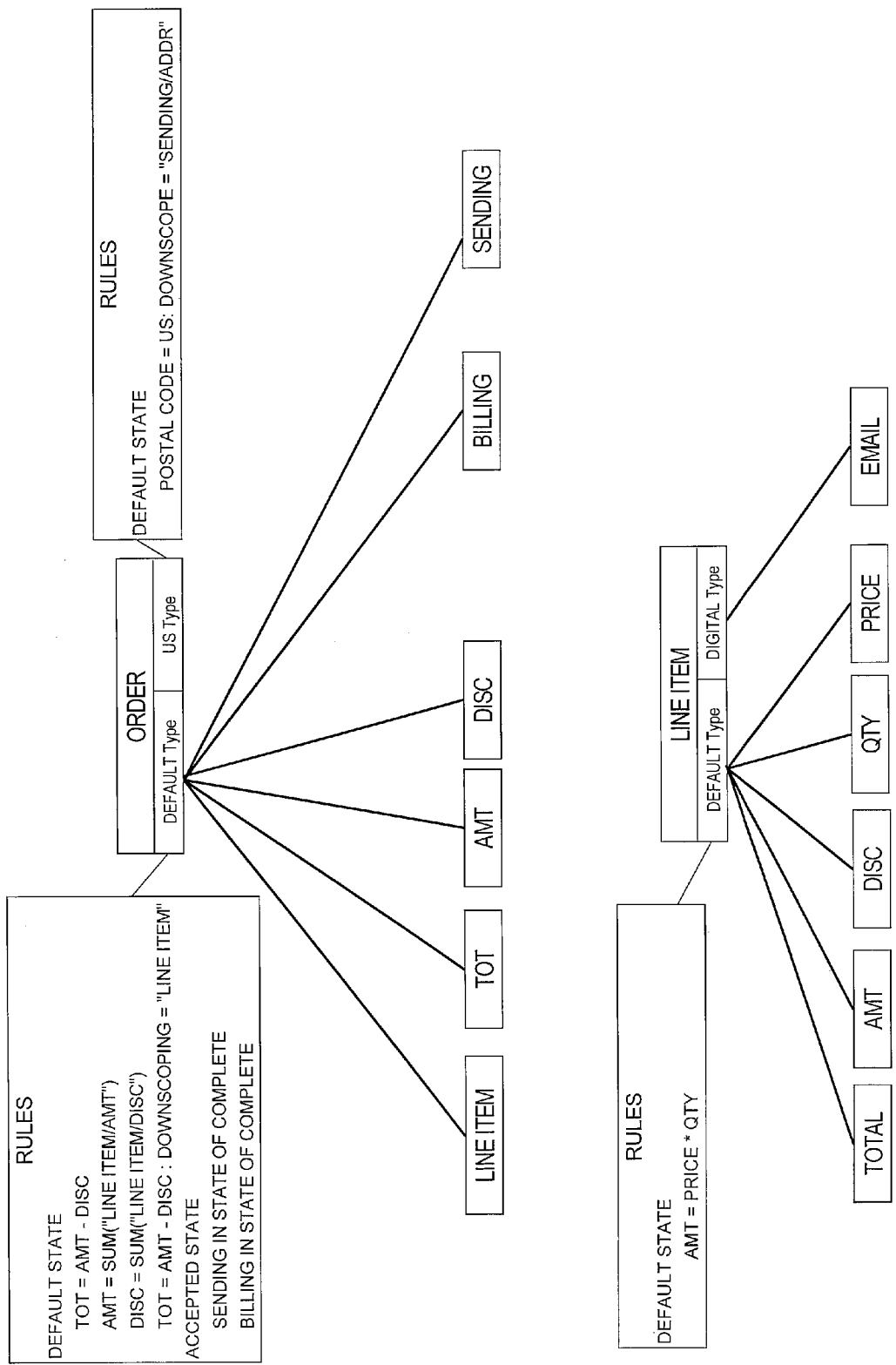
FIGS. 1A and 1B are diagrams depicting element with types and states according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Validating a document requires a determination of what rules are needed to validate the document. The set of rules needed to validate a document is referred to herein as the document rule set. The operation of determining the document rule set is referred to herein as document rules collection. Described herein are document rules collection techniques for a decentralized schema.

The techniques for document rules collection are described within the context of a certain model of a decentralized schema. To describe the techniques, it is important to first describe the model. It should be understood, however, the techniques described herein are not limited to the particular model of a decentralized schema described herein.

Element and Decentralized Schema

An advantage of a mark-up language is that tags that are used to structure a document may be given names that are descriptive of the tag's content to humans. An "element" extends the descriptive power of tags to computing devices. As the term is used, an "element" associates a name with a set of rules declared for the content of the nodes having that name. A node in a document having a name of an element is referred to as an instance of the element.

This definition of "element" should not be confused with the definition conventionally ascribed to "element" by the XML community, which is that an element is a node in a document.

Within a domain of documents, a desirable property is semantic consistency among tags with the same name. To be semantically consistent within a domain of documents, nodes that have the same name share one or more central properties, even when the same node name appears in documents having different schemas. The semantic consistency may be achieved through the power of a decentralized schema.

In a decentralized schema, a corpus of elements declares schemas for documents and nodes in a collection of documents. A valid document must be a valid element instance of an element in the corpus; the element need not declare that the element defines a document schema, as is in the case of a document-centralized schema. A valid node within a document must at least be a valid instance of the element having the node's name.

While it is important that element instances have consistent properties across a set of documents, element instances may need to be further refined for various contexts in which the element instances occur. For example, an element SHIPPING may be defined as a scalar dollar value. It may be useful to devise an order element representing orders with free shipping that can further constrain instances of SHIPPING to zero. A decentralized schema allows such further refinement by allowing a structured element to specify rules that, for any instance of the structured element, apply to descendant element instances contained therein, as shall be further described below.

Types of Elements

There are two main kinds of elements. A scalar element defines the content of a scalar node.

A structured element lists other elements, which are referred to as child elements contained or listed by the structured element. The structured element is referred to as a parent element with respect to the child elements. The structured element defines rules that apply by default to child elements, or more specifically, instances of the child elements within an instance of the structured element.

Figure 1B:
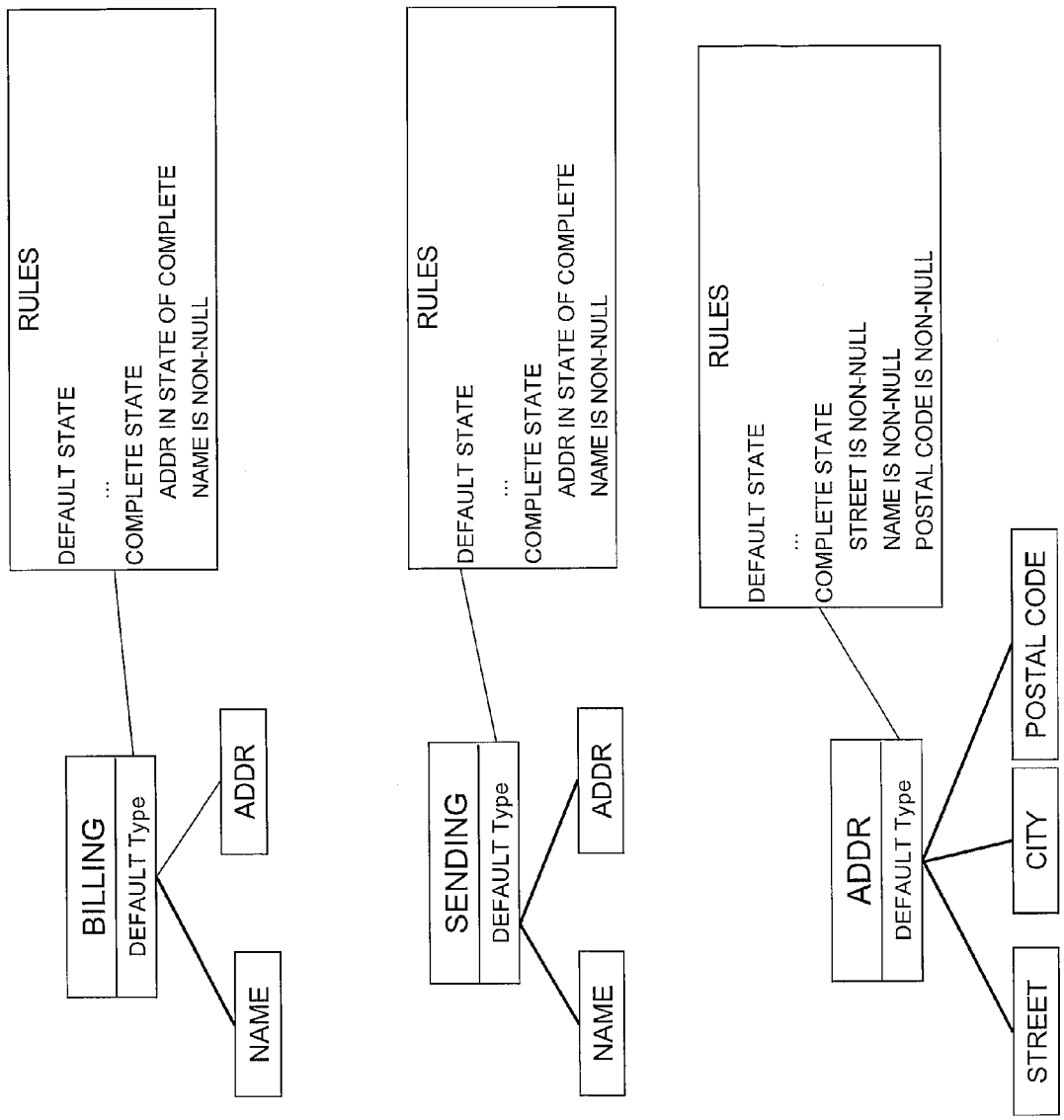

FIGS. 1A-1B depict illustrative elements according to an embodiment. Referring to FIG. 1A, it depicts element ORDER, which represents an order. Element ORDER lists as child elements LINE ITEM, TOT, AMT, DISC, BILLING, and SENDING.

LINE ITEM is a structured element that represents a line item in an order. Element LINE ITEM lists TOT, AMT, and DISC as child elements. These are the same elements listed as children of ORDER. In addition, LINE ITEM lists scalar element QTY and PRICE as child elements.

Types and States

According to an embodiment, structured elements are multiply typed. That is, a structured element's declaration may specify multiple types. According to an embodiment, a structured element has a default type, specifying a base element schema governing all element instances of any of the structured element's declared types. A type for a structured element other than the default type is referred to herein as a non-default type.

Types may be mutable. A mutable type has one or more "type states" or "states." According to an embodiment, each state may define zero or more rules. Every type has a default state. A state for a type other than the default state is referred to herein as a non-default state.

Referring to FIG. 1, element ORDER has two types, the default type and the type US. The default type has two states, the default state and the ACCEPTED state. The default state defines the following calculations: TOT=AMT−DISC, AMT=SUM("LINE ITEM/AMT"), DISC=SUM("LINE ITEM/DISC").

States facilitate development of types that model objects that evolve or transition between stages. A state may be used to represent an object at a particular stage. As an example of use of states, the state ACCEPTED of the default type of ORDER represents orders that have been accepted.

For type US there is one default state. The default state declares a rule that, through "downscoping", constrains descendant element POSTAL CODE instances to a U.S. postal code. Downscoping shall be described later in greater detail.

The default type and default state of LINE ITEM specifies the calculation AMT=PRICE*QTY. LINE ITEM also defines type DIGITAL, representing items than can be delivered digitally. The default state of type DIGITAL lists element EMAIL, representing an email address for delivery of a digital item.

Referring to FIG. 1B, BILLING and SENDING are structured elements. BILLING represents the entity to which an order is billed. SENDING represents the destination to which to ship the order.

Both BILLING and SENDING contain two other elements, scalar element NAME and structured element ADDR. BILLING and SENDING also have a default state with rules (not shown) and a state COMPLETE. The COMPLETE state for both BILLING and SENDING requires that child element instance NAME be a non-null value and that a child element instance ADDR be in a state COMPLETE.

Element ADDR is a structured element that contains three child scalar elements STREET, CITY and POSTAL CODE. Element ADDR has a default state with rules (not shown) and a state COMPLETE. The COMPLETE state includes rules that require child element instances STREET, CITY, and POSTAL CODE be non-null.

Elements and the rules therein can be expressed using schema declarations. For example, calculations may be declared using the XQuery language. The XAP patent application provides examples of element declarations. It should be understood that embodiments are not limited to any particular language, format, or syntax for specifying paths, constraints or calculations.

Illustrative Document

Figure 2:
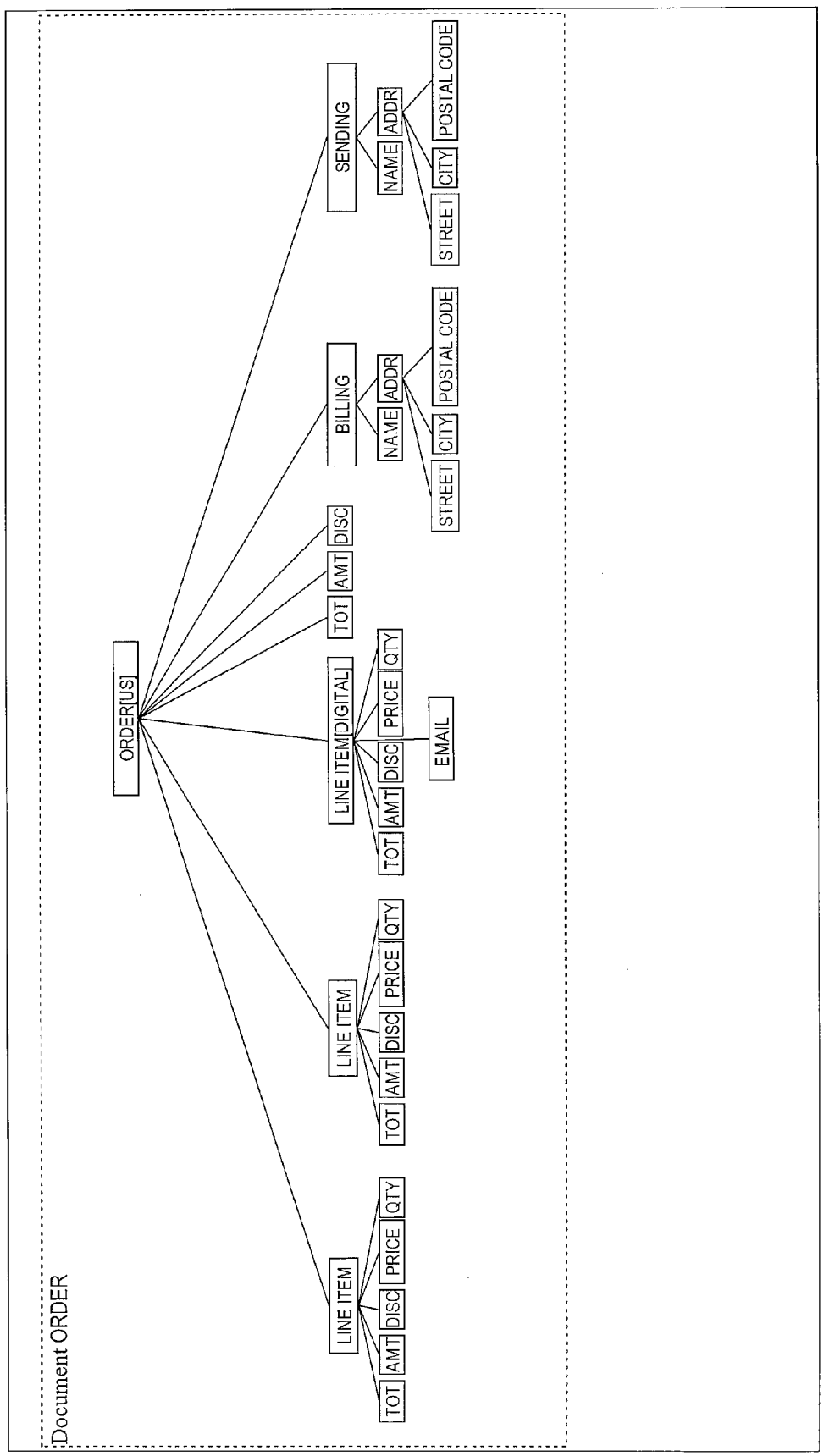
FIG. 2 is a diagram depicting a document containing nodes that are instances of elements according to an embodiment of the present invention.

A document may be any instance of a structured element in a corpus of elements. FIG. 2 depicts a document ORDER that is an instance of element ORDER of type US. The nodes are referred to by their node name. Of course if the node is an instance of an element, the node name is the name of the element. If the node is an instance of a type other than the default type of the element, the type is designated in a bracket.

Referring to FIG. 2, ORDER[US] is the root node of document ORDER. Among the child nodes of ORDER[US] are scalar element instances TOT, AMT, and DISC.

In addition, ORDER[US] contains instances of the default type of element LINE ITEM. Each of these child nodes includes a child instance of a scalar element listed by the default state of LINE ITEM, which are TOT, AMT, DISC, PRICE and QTY.

Another node LINE ITEM[DIGITAL] in ORDER[US] is an instance of the DIGITAL type of element LINE ITEM. Node LINE ITEM[DIGITAL] includes instances of the child elements contained by the default type, which are TOT, AMT, DISC, QTY, and PRICE. In addition, node LINE ITEM [DIGITAL] includes an instance of element EMAIL, which is specific to type DIGITAL.

ORDER[US] also contains node BILLING, an instance of element BILLING, and node SENDING. Both nodes BILLING and SENDING are structured nodes that contain the nodes ADDR and NAME. Node ADDR is a structured node that contains child element instances STREET, CITY, and POSTAL CODE.

Paths and Type-Qualified Paths

For a given node, a path is the sequence of element names that comprise (1) each of the zero or more ancestor node names between the given node and a context node and (2) the element name of the given node, referred to herein as the terminal element. Paths are expressed using path expressions. According to an embodiment, a path expression is a sequence of ordered path element names separated by the delimiter "/". For example, in document ORDER, assuming that the node BILLING is the context node, the path expression ADDR/CITY represents a path of the node CITY that is the descendant of BILLING.

An absolute path is a path where the context node is the root node. A root node is the one node in a node tree without a parent. In document ORDER, ORDER[US] is the root node. In a path expression, an absolute path is expressed by denoting the root node as the context, preceding the element name of the root node with an initial "/". For example, /ORDER/BILLING/ADDR/CITY is an absolute path for node CITY.

A type-qualified path is a path in which each element in the path is qualified by at least one type. According to an embodiment, in a type-qualified path expression for a type-qualified path, the node's type is explicitly identified using a type identifier contained in brackets. The absence of such a bracket for a node name specifies the default type of the node's element.

For example, the type-qualified path expression /ORDER [US]/SENDING/ADDR/CITY identifies node CITY. No node in ORDER[US] is identified by the type-qualified path expression /ORDER/BILLING/ADDR/CITY (note ORDER has no bracketed type identified).

Paths (and path expressions thereof) can identify a node in a document. The node identified by a path is a node that has that path. Because multiple nodes may have the same path, a path may identify more than one node. For example, the type-qualified path expression /ORDER[US]/LINE ITEM identifies two nodes in ORDER[US], while /ORDER[US]/LINE ITEM[DIGITAL] identifies one node.

A path not qualified by type may simply be referred to herein as being unqualified. A node is identified by an unqualified path if the name of the node and the zero or more ancestor nodes match the respective name in the path, regardless of the type of which the node or any ancestor is an instance. Thus, the unqualified path /ORDER/LINE ITEM identifies both the nodes named LINE ITEM and the node LINE ITEM[DIGITAL] in document ORDER.

Any child or descendant node of a node identified by a path is referred to as a child or descendant of the path. Thus, node EMAIL is a child of the qualified path /ORDER/LINE ITEM [DIGITAL] and of the unqualified path /ORDER/LINE ITEM.

According to an embodiment, a type identifier in a path expression may identify multiple types using pattern matching notation. For example, /ORDER[US]/LINEITEM[*]/ADDR/CITY identifies the city nodes that are descendants of LINEITEM[DIGITAL] and both LINEITEM nodes.

Path expressions may be in any language, format, or standard. For example, paths may be expressed using XPath. It should be understood that embodiments are not limited to any particular language, format, or syntax for expressing or specifying paths.

Expression of Rules

A rule of a structured element may specify one or more nodes, within an instance of the element, that are subject to the rule for purposes of validation. The one or more nodes are referred to herein as subjects of the rule and as being subjected to the rule, while the rule is referred to as being applicable to or applied to the one or more nodes. For ORDER [US], for the constraint NAME IS NON-NULL of the COMPLETE state of BILLING, the subject is node NAME.

A calculation defines an expression that evaluates to a value for a subject referred to herein as a target. Targets are scalar element nodes. The expression may contain operands that are identified using a relative path expression. For an instance of the element defining the calculation, the context is the path of the element instance. In the case where the target and operand refers to a child element, the relative path expression is simply the child element's name.

For example, LINE ITEM defines the following calculation:

$$AMT=PRICE*QTY$$

Defining this calculation for LINE ITEM causes, for each LINE ITEM node in ORDER[US], the AMT child node to equal the result of the calculation PRICE*QTY.

Because a relative path expression is used to refer to an operand, a calculation when operative within an element instance may identify multiple nodes. For example, the element ORDER may define the following calculation:

AMT=SUM("LINE ITEM/AMT")

In ORDER[US], this causes the child node AMT of ORDER[US] to equal the sum of multiple nodes AMT, children of each of the LINE ITEM nodes. Thus, the relative path LINE ITEM/AMT identifies and resolves to the three LINE ITEM nodes (which includes node LINE ITEM[DIGITAL]/AMT).

A node can be subject to rules that are operative within the node's parent element instance. For example, LINE ITEM defines the following calculation AMT=PRICE*QTY. The rule is operative within instances of LINE ITEM. For each instance of LINE ITEM, child node AMT is subject to the calculation as a target of the calculation.

The rules of the default state of the default type of an element are operative within any instance of the element. The rules of the default state of a type are operative within all instances of the type. The rules of a non-default state of a type are inoperative within any instance of a different type or of the same type when validation against that non-default state specifically is not required.

Downscoping

As mentioned previously, it is useful to refine the set of rules to apply to instances of an element beyond those required to be operative by the element definition itself. Downscoping allows a structured element to specify rules that are to be operative within descendant structured element instances of the structured element. Downscoped rules are applied to child element instances of the descendant structured element instances.

For example, the default state of the type US for ORDER declares the downscoped rule POSTAL CODE=US:DOWNSCOPE="SENDING/ADDR", specifying to downscope the rule POSTAL CODE=US according to the downscoping path expression SENDING/ADDR. In ORDER[US], the rule is operative within the child node ORDER[US]/SENDING/ADDR, a non-immediate descendant of ORDER[US], and is applied to the node ORDER[US]/SENDING/ADDR/POSTAL CODE.

A downscoped rule includes a rule and a downscoping clause, which specifies a downscoping path, a relative path that is unqualified or qualified. According to an embodiment, the downscoping path may only be unqualified. In this example, the rule that is downscoped is POSTAL CODE=US and the downscoping clause is DOWNSCOPE="SENDING/ADDR", and the downscoping path is SENDING/ADDR. A downscoped rule causes, for element instances of the element defining the downscoped rule, the rule to be operative within the descendant elements identified by the relative path within the context of the element instance. In the case of document ORDER[US], the downscoped rule POSTAL CODE=US:DOWNSCOPE="SENDING/ADDR" causes the rule POSTAL CODE=US to be operative within descendant element instance SENDING/ADDR, the node identified by the downscoping path expression SENDING/ADDR, within the context of element instance ORDER[US].

Like constraints, calculations may be downscoped. For example, the default type of element ORDER declares the downscoped rule TOT=AMT−DISC:DOWNSCOPING="LINE ITEM". Thus, the calculation TOT=AMT−DISC is applied to each of the two LINE ITEM nodes and node LINE TIME[DIGITAL].

When Rules of Type or State are Operative or Applicable

There are various ways a rule becomes operative within a structured element instance. A rule may be defined by the structured element's default state of the default type. An element instance may contain an attribute (e.g. XML attribute) that specifies the instance's type, making at least the rules of the default state of the type operative within the element instance.

A rule may become operative when the element instance enters a non-default state which defines the rule. For example, when node ORDER[US]/BILLING is in the COMPLETE state, the rule NAME IS NON-NULL is operative, the rule being declared by the COMPLETE state of BILLING.

A state may be specified in several ways. First, an operative constraint for a parent node of a child element instance may constrain the child element instance to a particular state. For example, in the ACCEPTED state, the rule SENDING IN STATE OF COMPLETE is operative within node ORDER[US]. This constraint constrains node SENDING to the state COMPLETE of element SENDING.

The state of a document's root node may be specified by an input state parameter for validation of a document. For example, the ACCEPTED state may be specified for ORDER[US] as an input state parameter when invoking validation of the document. The rules for the ACCEPTED state of ORDER are operative, as well as the rules for the default state of the default type and the default state of type US.

In this case, passing in the ACCEPTED state as an input parameter has a cascading effect on what rules become operative throughout the hierarchy of nodes in ORDER[US]. The ACCEPTED state of ORDER[US] constrains nodes SENDING and BILLING to the COMPLETE state, making that state's rules operative, which causes the respective ADDR child nodes in SENDING and BILLING to be in the COMPLETE state and making that state's rules operative.

Document Rules Collection for Decentralized Schema

Under a decentralized schema, document rules collection is based on the "hierarchical context" of element instances in the document. The hierarchical context for an element instance is the particular absolute path under which an element instance falls in a document. Thus, element instances that are nodes identified by the same path share the same hierarchical context.

The element instance's hierarchical context is of paramount importance because the hierarchical context dictates which rules are operative within the element instance. Specifically, which rules are operative depends on the element, type, and state of each ascendant node in the path to the instance. Instances of the same element can have a hierarchical context that varies between different documents and even within the same document. For two nodes that are instances of the same element but that have a different hierarchical context within a document or between documents, a different set of rules can be operative therein.

In a decentralized schema, any document in the collection of documents can be an instance of a structured element, which itself can be comprised of a multitude of instances of a multitude of structured elements. Validation of any particular document requires a document rule set that includes the rule set operative for each instance of a structured element in the document.

Because the rules that are operative for any particular element instance depends on the hierarchical context of the instance, the rule set operative for the element instance is formed when the hierarchical context can be resolved, that is, when the path of the instances can be resolved in the document that contains the instances. Thus, determination of a rule set needed for any element instance not only requires reference to the element's declarations in a corpus of elements and but also a determination of the instance's place within the hierarchical structure of a document.

According to an embodiment of the present invention, document rule set collection is performed on an individual document basis when the hierarchical context of any element instance in the document is resolvable. The rules are collected by traversing and visiting the nodes of the document in depth-first order. In a depth-first ordered traversal, a document is traversed starting at a root node, each node is visited, and its children traversed and visited before traversing to a sibling. Visiting a node means that operations are performed with respect to the node. Such operations include examining, collecting, and recording rules from the element of the node from a corpus of elements.

It is important to note that depth-first traversal means that by the time any instance of a structured element is visited, all ancestor nodes have been visited. Thus, any rule downscoped to an instance by an ancestor's element and any state constraint to which the instance is subject, has been encountered and recorded by the time the instance is visited during traversal.

Given an element and a document having instances thereof, instances of the element having the same hierarchical context may share the same rule set while instances having a different hierarchical context may not. During the depth-first traversal, rules are collected in effect for each encountered hierarchical context or path of a structured element and stored in data structures associated with the hierarchical context. Once the document is traversed and the rules collected, the document rules collection data structures have a meta-content and organization customized for the document. The rules collected in the document rules collection data structures may be further processed and then used to efficiently validate the document.

Document Rules Collection Structures

According to an embodiment of the present invention, document rules collection is performed by collecting rules for each hierarchical context corresponding to a type-qualified path of a structured node in a document. The rules are collected by traversing and visiting the nodes of the document in depth-first order, as shall be described later in further detail.

Figure 3:
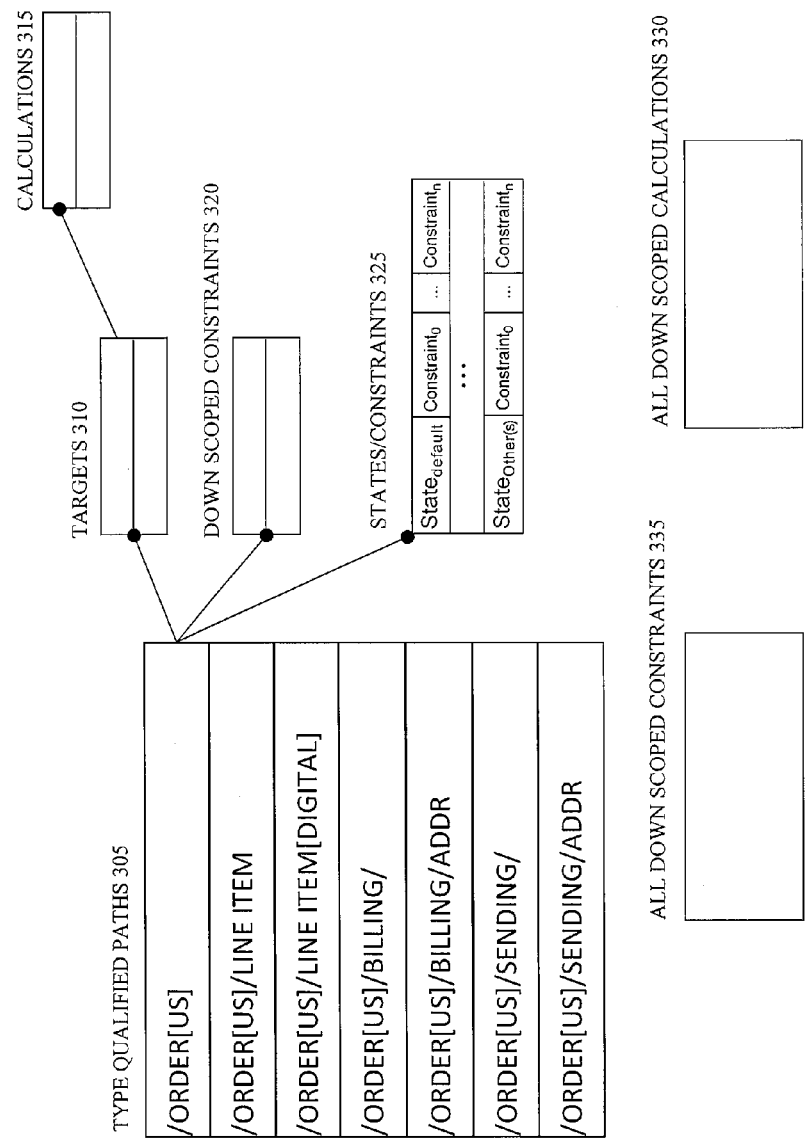
FIG. 3 is a diagram depicting document rules collection data structures used to collect rules to validate a document according to an embodiment.

FIG. 3 depicts document rules collection data structures 301. Referring to FIG. 3, type-qualified paths 305 is a list that contains multiple entries referred to herein as a type-qualified path entry. Each such type-qualified path entry contains rules for a set of nodes in a document that share the same type-qualified path in a document. Thus, the type-qualified path expression of an entry identifies the nodes in a document in which rules in the entry may be operative.

A type-qualified path entry in type-qualified paths 305 is referred to by its associated type-qualified path. Type-qualified path entry /ORDER[US] contains the rules for node ORDER[US], type-qualified path entry /ORDER[US]/LINE ITEM contains rules for both LINE ITEM nodes, type-qualified path entry /ORDER[US]/LINE ITEM[DIGITAL] contains rules for LINE ITEM[DIGITAL], type-qualified path /ORDER[US]/BILLING contains the rules for the so identified instance of BILLING, type-qualified path /ORDER[US]/SENDING contains rules for the so identified instance SENDING, /ORDER[US]/BILLING/ADDR contains rules for the so identified instance of ADDR in ORDER[US], and /ORDER[US]/SENDING/ADDR contains rules for the so identified instance ADDR.

Each type-qualified path entry contains multiple lists that each contain a specific kind of rule. States/constraints 325 contains constraints. The list is subdivided by state, and thus contains one or more state entries. Each state entry contains a sub-list of zero or more constraints. States/constraints 325 contains an entry for the default state, and zero or more others states.

Downscoped constraints 320 contains entries, each containing a constraint downscoped to all nodes of the respective type-qualified path.

Targets 310 is a list of entries, each containing a calculation's target that is a child of the type-qualified path. For each target in targets 310, there is a calculations list 315 because a target may be the subject of multiple calculations. A target being subject to multiple calculations can create a conflict about which calculation to apply to the target. Such conflicts can be handled using various conflict resolution techniques.

For convenience of expression, a target in targets 310 and calculation in calculations 315 are referred to as being included or contained in a type-qualified path entry that contains targets 310 and calculations 315. Similarly any target, or rule, e.g. calculation or constraint, in a type-qualified path entry is referred to as being contained or belonging to the type-qualified path.

Document Rules Collection

Figure 4:
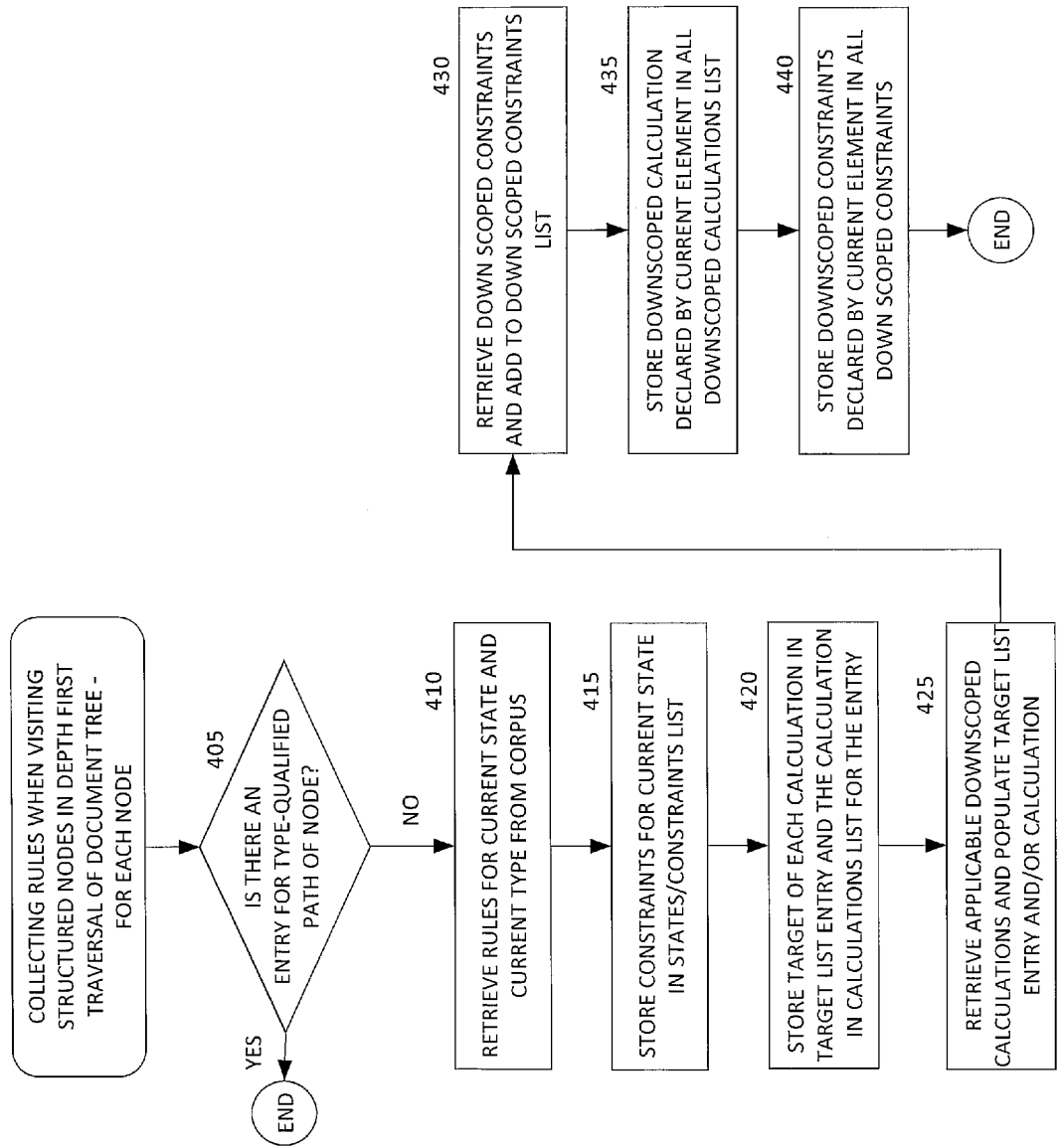
FIG. 4 is a diagram depicting a technique for document rules collection for a document according to an embodiment.

FIG. 4 shows operations performed when each structured node is visited during a depth-first traversal of a document. The operations are bypassed for scalar nodes. The operations are illustrated using document ORDER and the document rules collection data structures depicted in FIG. 3. In the illustration, the document rules collection data structures are not yet populated as depicted. The particular node being visited is referred to as the current node. For purposes of illustration, the input validation state is ACCEPTED.

Referring to FIG. 4, the first node traversed is structured node ORDER[US]. It is determined that there is no type-qualified path entry for the type-qualified path /ORDER[US] (405). Given the rules for the default state and default type are operative for all instances of an element, the declared rules for the default state and default type of element ORDER are retrieved from the corpus of elements (410). Since the type of the current node ORDER[US] is US, the rules for the default state of type US of element ORDER are also retrieved (410). Because the node ORDER is required to validate against the ACCEPTED state of the default type, the rules for the ACCEPTED state are also retrieved. The rules retrieved that are constraints are then stored in states/constraints 325 (415).

For each rule retrieved that is a calculation, the target of the calculation is added as a target list entry to the targets 310 and the calculation is added to calculations 315 in association with the target list entry (420). For example, ORDER declares the calculation TOT=AMT−DISC. The target of this calculation TOT is added to an entry of targets 310. The calculation is added as an entry to calculations 315, the entry including a pointer or other type of reference to the target list entry for TOT.

Next, calculations downscoped to the current node are retrieved and added to the targets 310 and calculations 315 (425). For ORDER[US], being the first node visited in the depth-first traversal, there are no entries in all downscoped calculations 330. Likewise, there are no downscoped constraints in all downscoped constraints 335 to add to downscoped constraints 320 (430).

Next, downscoped calculations declared in element ORDER are stored in all downscoped calculations 330 (435). For example, the downscoped calculation TOT=AMT−DISC:DOWNSCOPING="LINE ITEM" is added as an entry to all downscoped calculations 330. The absolute qualified path node of ORDER[US], being resolvable to /ORDER[US] due to the depth-first traversal, is also recorded in the entry. Such information is used to determine whether the downscoped calculation is operative within a subsequently visited node, when the subsequently visited node's absolute qualified path can be resolved. Between this path, the already recorded absolute qualified path of the ORDER[US], and the relative path expression of the downscoping clause of the downscoped rule, it can be determined whether the rule has been downscoped to the subsequently visited node.

Finally, the downscoped constraints declared by element ORDER are stored in an entry of all downscoped constraints 335 (440). The absolute qualified path node /ORDER[US] is also recorded in the entry.

The next node traversed and visited is a LINE ITEM node. It is determined that there is no type-qualified path entry for the type-qualified path /ORDER[US]/LINE ITEM (405), and therefore an entry is created. The declared rules for the default state and default type of element LINE ITEM are then retrieved from the corpus of elements (410). Of these retrieved rules, constraints are stored in states/constraints 325 (415), and the calculations and respective targets are stored in calculations 315 and targets 310 (420), respectively.

Next, the operative downscoped calculations are retrieved and added to the targets 310 and calculations 315 (430). All downscoped calculations 330 contains the entry added for ORDER[US], which records the downscoping rule TOT=AMT−DISC:DOWNSCOPING="LINE ITEM" and the corresponding qualified path, /ORDER[US]. Given the downscoping relative path expression is LINE ITEM, which relative to the qualified path /ORDER[US] recorded in the entry, matches the qualified path /ORDER[US]/LINE ITEM of the current node, the downscoped calculation has been downscoped to the current node LINE ITEM. The downscoped calculation and respective target is added to calculations 315 and targets 310, respectively.

All the children nodes of LINEITEM-TOT, AMT, DISC, PRICE, and QTY—are scalar nodes. Therefore, no rules need to be collected for these nodes.

When node LINE ITEM[DIGITAL] is visited, it is determined that there is no type-qualified path entry for the type-qualified path /ORDER[US]/LINE ITEM[DIGITAL] (405), and therefore an entry is created. The declared rules for the default state and default type of element LINE ITEM and for the default state of type DIGITAL are then retrieved from the element corpus (410). Of these retrieved rules, constraints are stored in states/constraints 325 (415), and the calculations and the respective targets are stored in calculations 315 and targets 310, respectively.

All downscoped calculations 330 contains the entry added for ORDER[US], which records the downscoping rule TOT=AMT−DISC:DOWNSCOPING="LINE ITEM" and the corresponding qualified path /ORDER[US]. In an embodiment, when determining whether a rule has been downscoped to the current node, the types in the qualified path are ignored, that is, a match is in effect determined based on unqualified paths. Given the downscoping relative path expression is LINE ITEM, which relative to the path /ORDER[US] recorded in the entry and ignoring type, matches the qualified path /ORDER[US]/LINE ITEM[DIGITAL] of the current node, the downscoped calculation has been downscoped to the current node LINE ITEM[DIGITAL]. The downscoped calculation and respective target is added to calculations 315 and targets 310, respectively.

In an embodiment, the types of the qualified path of the current node are considered when determining whether a rule has been downscoped to the current node. In this case, the downscoping path expression LINE ITEM does not match the qualified path /ORDER[US]/LINE ITEM[DIGITAL] of the current node.

When the second LINE ITEM node is visited, it is determined that there is a type-qualified path entry for the type-qualified path /ORDER[US]/LINE ITEM (405). Document rules collection for the node has been completed already.

When the SENDING node is visited, it is determined that there is no type-qualified path entry for the type-qualified path /ORDER[US]/SENDING (405), and therefore an entry is created. The declared rules for the default state and default type of element SENDING are then retrieved from the element corpus (410). The constraints are stored in states/constraints 325 (415), and the calculations and respective targets are stored in calculations 315 and targets 310, respectively (420). Because the parent node ORDER is validated against the ACCEPTED state, making the rule SENDING IN STATE OF COMPLETE an operative rule of ORDER to which node SENDING is subject, the rules for the state COMPLETE of element SENDING are retrieved and stored. Thus, rules ADDR IN STATE OF COMPLETE and NAME IS NON-NULL are stored in states/constraints 325.

When the child node ADDR of parent node SENDING is visited, it is determined that there is no type-qualified path entry for the type-qualified path /ORDER[US]/SENDING/ADDR (405), and therefore an entry is created. The declared rules for the default state of the default type of element ADDR are then retrieved from the element corpus (410). The constraints are stored in states/constraints 325 (415), and the calculations and the respective targets are stored in calculations 315 and targets 310 (420), respectively. Because the parent node SENDING is validated against its COMPLETE state, making the rule ADDR IN STATE OF COMPLETE an operative rule of SENDING that applies to the child node ADDR, the rules for the state COMPLETE of element ADDR are retrieved and stored. Thus, rules STREET IS NON-NULL, NAME IS NON-NULL, and POSTAL CODE IS NON-NULL are stored in states/constraints 325.

Scheduling Calculations

Figure 5:
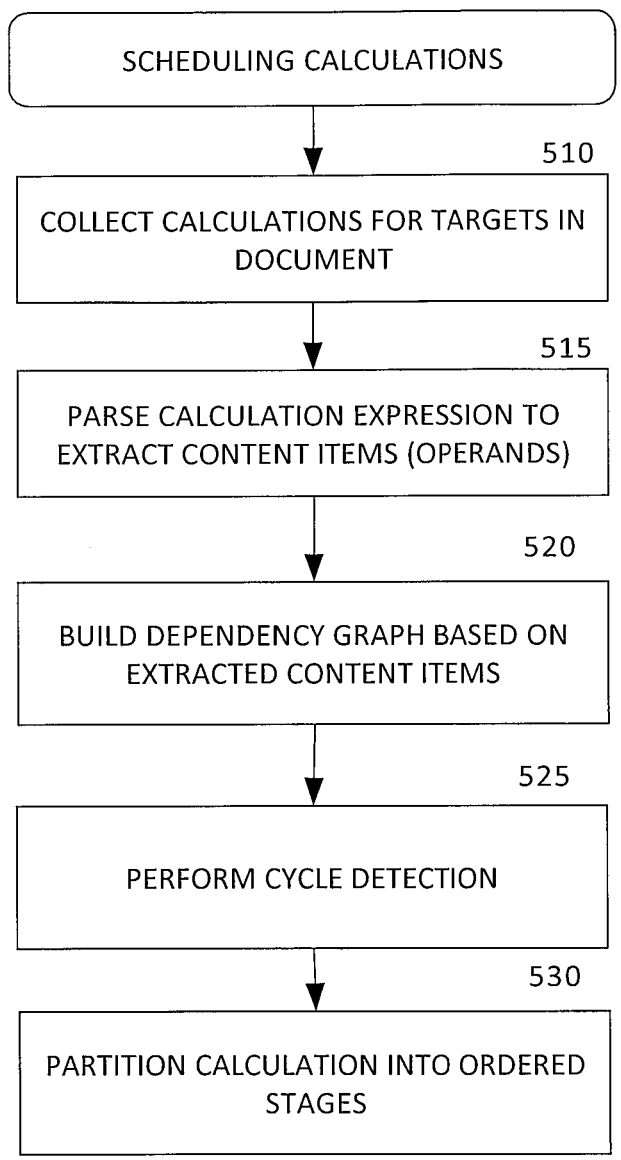
FIG. 5 is a diagram outlining a technique for scheduling rules according to an embodiment.

Validation of a document includes scheduling of calculations collected during document rules collection. Scheduling calculations for a document includes (1) defining a sequence in which calculations are executed properly, and (2) detecting any situation that would make it impossible to determine a proper sequence of execution. FIG. 5 summarizes a technique for accomplishing these goals according to an embodiment of the present invention.

Referring to FIG. 5, the calculations for the targets in a document are gathered (510). In an embodiment, calculations can be gathered using the document rules collection technique described above, although an embodiment is not limited to collecting rules in this way. The calculation expressions are parsed to extract the operands (515).

A calculation may depend on the result of another calculation. A dependency graph is built to reflect such dependencies between the gathered calculations (520). The cycle detection is performed using the dependency graph (525). The detection of least one cycle indicates an error.

Finally, the calculations are partitioned into schedule stages, ordered from early to later schedule stages. The partitioning is performed such that no dependent calculation belongs to the same or earlier schedule stage than a calculation upon which the dependent calculation depends, as shall be explained in further detail.

Extracting Dependencies and Building Dependency Graph

To build the dependency graph, each of the calculation expressions collected in the document rules collection structures are parsed to determine the operands. The operands and targets are fully qualified by their respective type-qualified path. A "target node" is generated for each target of a calculation, and thus a target node not only represents a target but the calculation. For each particular target having a calculation expression operand resolving to another target, a directed arc is established from the particular target's node to the other's target's node. As a result, for each dependent calculation listed in a calculations 315, there is an arc from a respective target node of the dependent calculation to the respective target node of the calculation upon which the dependent calculation depends.

Figure 6:
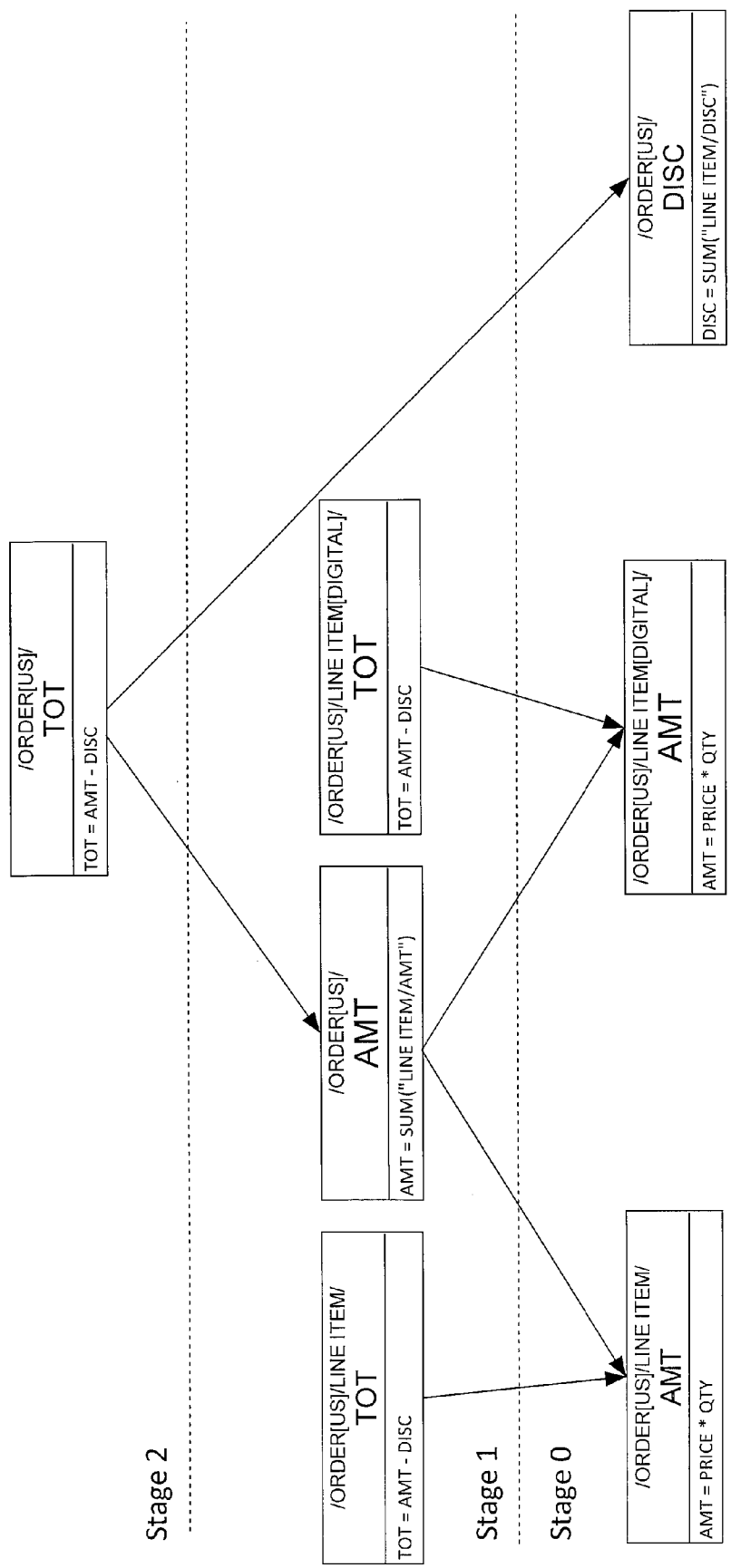
FIG. 6 is a diagram depicting a dependency graph according to an embodiment.

To illustrate, FIG. 6 shows a dependency graph for calculations collected during document rules collection performed for ORDER[US].

Referring to FIG. 6, dependency graph 601 is a directed graph comprising target nodes. Each target node is annotated with its target, type-qualified path, and calculation. A target node in FIG. 6 is referred to herein using the type-qualified path of the target node and the targets name. Thus, TOT of /ORDER[US] refers to the node at the very top of the dependency graph 601.

Dependency graph 601 is generated by examining and analyzing the rules collected in the document rules collection data structures 301 during document rules collection. The type-qualified path entry /ORDER[US] contains the calculation TOT=AMT−DISC, AMT=SUM("LINE ITEM/AMT"), DISC=SUM("LINE ITEM/DISC"), the targets of which are TOT, AMT, DISC, respectively. Target node TOT of ORDER[US] is qualified by type-qualified path /ORDER[US] and represents the target TOT. Similarly target node AMT of ORDER[US] is qualified by /ORDER[US] represents the target of calculation AMT=SUM("LINE ITEM/AMT"), and DISC of ORDER[US] is qualified by /ORDER[US] and represents the target of calculation DISC=SUM("LINE ITEM/DISC")

Note there are two instances of the same calculation and target declared by element LINE ITEM. This is a result having the same element LINE ITEM qualified by separate type-qualified paths /ORDER[US]/LINE ITEM and /ORDER[US]/LINE ITEM[DIGITAL] in type-qualified paths 305. Target node AMT of /ORDER[US]/LINE ITEM represents the target of calculation AMT=PRICE*QTY and target node AMT of /ORDER[US]/LINE ITEM[DIGITAL] represents the target of calculation AMT=PRICE*QTY. Similarly, target node TOT of /ORDER[US]/LINE ITEM represents the target of calculation TOT=AMT−DISC and target node TOT of /ORDER[US]/LINE ITEM[DIGITAL] represents the target of calculation TOT=AMT−DISC.

An arc directed from a first target node to a second target node represents that the calculation of the first target node is dependent on the calculation of the second target node. For example, there is a directed arc from AMT of /ORDER[US] to AMT of /ORDER[US]/LINE ITEM, representing that calculation AMT=SUM("LINE ITEM/AMT") is dependent on the calculation AMT=PRICE*QTY.

Determining dependencies between calculations entails parsing calculations in type-qualified paths 305 to extract operands and to determine whether each operand is a target of another calculation. This determination is made after resolving the document hierarchical contexts of the operands and targets to a type-qualified path.

For example, the type-qualified path entry for /ORDER [US] includes target AMT for calculation SUM("LINE ITEM/AMT") and the type-qualified path entry for /ORDER [US]/LINE ITEM includes the calculation AMT=PRICE*QTY. After resolving the targets and operands to the respective type-qualified paths, it is determined operand /ORDER[US]/LINE ITEM/AMT in calculation SUM ("LINE ITEM/AMT") is also the target /ORDER[US]/LINE ITEM/AMT for the calculation AMT=PRICE*QTY.

Partitioning into Schedule Stages

Based on dependency graph 601, the calculations are partitioned into schedule stages in a manner that is dependency consistent, that is, a dependent calculation is at a later stage than the calculation depended upon. This partitioning is accomplished by partitioning targets nodes in the dependency graph based on the dependencies represented by the graph. Each target node is marked with the schedule stage determined for the target node, thereby establishing a schedule stage for the target node's corresponding calculation. The calculation is referred to herein as being scheduled for the schedule stage established for the calculation.

FIG. 6 shows how the target nodes are partitioned into schedule stages. Schedule stage 2 is the latest stage and schedule stage 0 is the earliest stage. Target node TOT of /ORDER[US] is marked with schedule stage 2; the calculation TOT=AMT−DISC is scheduled for schedule stage 2. Target node AMT of /ORDER[US]/LINE ITEM is marked with the stage 1; the calculation AMT=PRICE*QTY (in type-qualified path entry /ORDER[US]/LINE ITEM) is earlier scheduled for schedule stage 0.

When the calculations are computed during validation, a calculation may be executed in any order with respect to any other calculation scheduled for the same schedule stage. However, the calculation is computed after any calculation scheduled for an earlier scheduled stage and before any calculation scheduled for a later schedule stage.

According to an embodiment, a calculation is scheduled in the earliest stage possible that maintains dependency consistency. Thus, a dependent calculation may be scheduled one or more stages later than the calculation upon which the dependent calculation immediately depends. For example, the dependent calculation TOT=AMT−DISC (see TOT of /ORDER[US]/) is scheduled for stage 2, while the calculation upon which it depends, DISC=SUM("LINE ITEM/DISC") is scheduled for stage 0.

FIG. 7 shows pseudo-code of an algorithm for determining schedule stages of target nodes and marking the target nodes with a schedule stage. In the pseudo-code, the term calculation refers to a target node in a dependency graph, such as dependency graph 601, because each target node logically represents a calculation. Line numbering in FIG. 7 numbers each line of pseudo code. The operation of blocks of lines of pseudo-code is explained by referring to the line number of the first line in the block.

The function schedule( ) is invoked (701). The schedule stage of each calculation is initialized to −1 (701). The recursive function scheduleRec(calc) is called for each calculation (706), beginning with any calculation in the dependency graph. The function scheduleRec(calc) (710) leaves the respective calculation marked with the schedule stage determined for the calculation, and returns the schedule stage.

When scheduleRec(calc) is invoked for a calculation ("current calculation"), if the current target node is already marked with a non-negative schedule stage (712), that schedule stage is returned. Otherwise, if the current calculation has no child dependents in the dependency graph, the current calculation is marked with schedule stage 0 (714).

Otherwise, for each calculation on which the current node depends ("dependency"), scheduleRec(calc) is invoked and returns the schedule stage of the dependency (721). If the stage of the current calculation is less the schedule stage that follows that of the dependency, then the current calculation's stage is set to the schedule stage that follows (722).

Hardware Overview

Claimed embodiments of techniques and mechanisms described herein are implemented on computer systems, and are preferably used in environments to validate a voluminous number of complex documents. As a practical matter, the use of a computer system in claimed embodiments is required. The techniques should not be construed in any way as being amendable to being performed mentally or manually. Example computer systems that may be used to implement an embodiment include the computer systems described in this section and the servers configured to execute XAP applications described in the XAP patent application.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
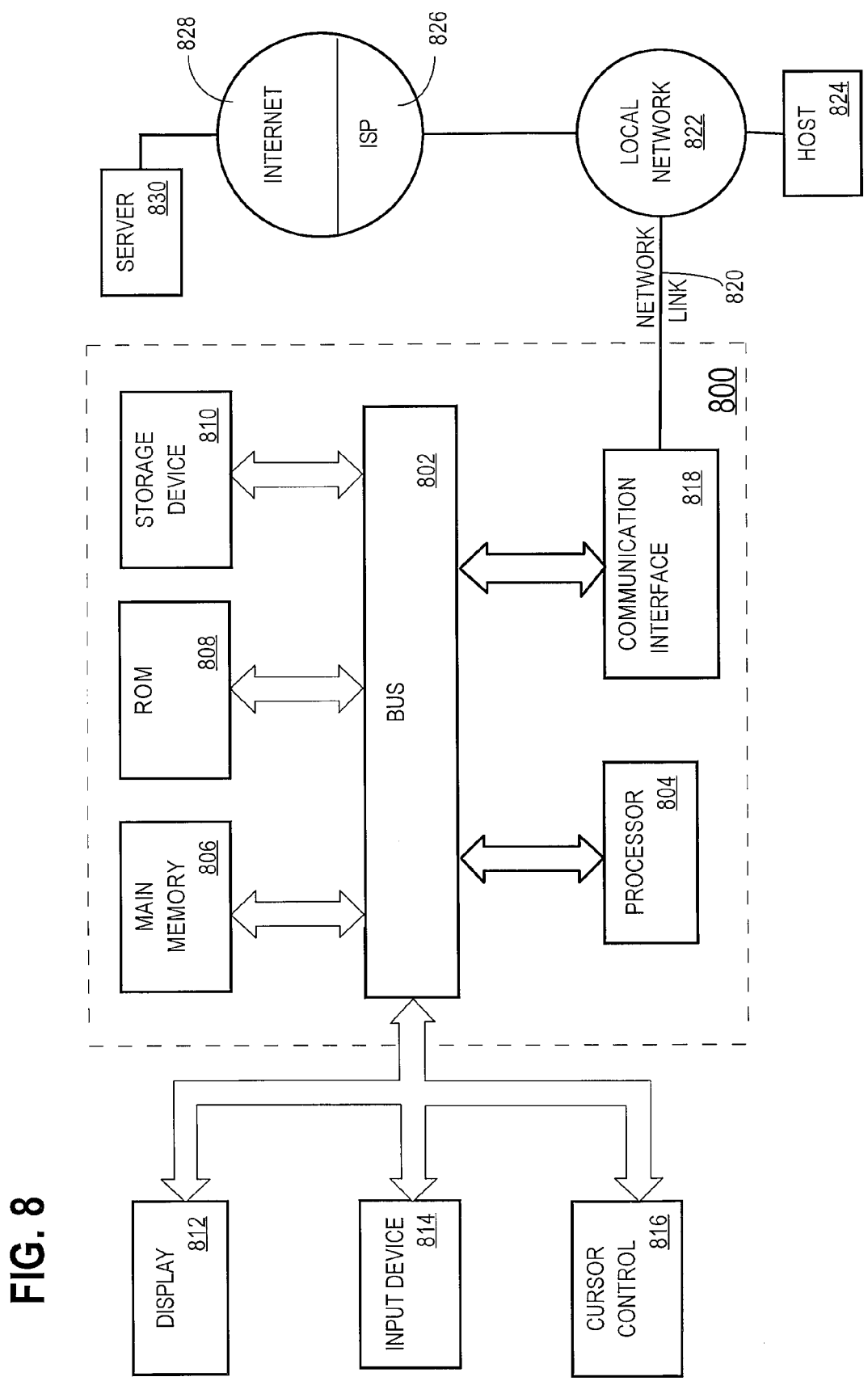
FIG. 8 is a diagram depicting a computer system that may be used in an embodiment.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising steps of:
  determining paths of nodes within a document, wherein each node of said nodes is an instance of an element of a corpus of elements, each element of said corpus of elements declaring a set of rules comprising at least one of:
    one or more constraints that constrain descendant elements of said each element,
    one or more calculations for target descendant elements of said each element,
    wherein each path identifies a subset of one or more nodes of said nodes within said document;
  for each path of said paths, collecting and storing, in association with said each path of said paths, rules for a particular element of which respective one or more nodes identified by said each path are an instance, said rules for the particular element including the set of rules declared by the particular element, said respective one or more nodes belonging to said nodes and said particular element belonging to said corpus of elements; and
  validating the document based on rules collected by the collecting and storing for each path of said paths.

2. The method of claim 1, wherein:
  each element of said corpus of elements is a type of said each element; and
  each path of said paths is qualified by a respective type of each element in the path.

3. The method of claim 1, wherein:
  each element of said corpus of elements is a type of said each element, wherein said type of said each element has one or more states, wherein the set of rules declared by said each element is defined for a state of said one or more states; and
  wherein each path of said paths is qualified by a respective type of each element in the path.

4. The method of claim 1,
  wherein the nodes include an ascendant node and a descendant node that is a descendant of the ascendant node;
  wherein the ascendant node is an instance of a first element and is associated with a first path, wherein the descendant node is associated with a second path;
  wherein the first element defines a downscoped rule; and
  wherein collecting and storing, in association with said each path, rules defined for the element, includes collecting and storing, in association with said second path of said descendant node, said downscoped rule.

5. The method of claim 1,
  wherein rules collected and stored in association with the paths include calculations;
  wherein the steps further include:
  based on dependencies between the calculations, partitioning the calculations into stages, ordered from earlier to later, each stage of said stages containing a subset of one or more of said calculations; and
  wherein for each stage of said stages, each calculation of said stage is not dependent on a calculation in said stage or in a later stage.

6. A method comprising,
  traversing and visiting nodes within a document, wherein each node of said nodes is an instance of an element of a corpus of elements, each element of said corpus of elements declaring a set of rules comprising at least one of:
    one or more constraints that constrain descendant elements of said each element,
    one or more calculations for target descendant elements of said each element;
  wherein visiting each node of said nodes comprises:
    determining whether there is an entry for a path of said each node in a list of paths;
    in response to determining that there is no entry for the path of said each node,
      retrieving one or more rules declared by a respective element of which said node is an instance;
      adding in association with said path an entry to the list of paths;
      adding the one or more rules retrieved to the entry; and
  validating the document based on the rules in said list of paths.

7. The method of claim 6, wherein visiting said each node includes, in response to determining that there is no entry for the path of said each node, adding to a list for downscoped rules a downscoped rule defined by said respective element.

8. The method of claim 6, wherein visiting said each node includes, in response to determining that there is no entry for the path of said each node:
  determining that a list for downscoped rules includes a downscoped rule that applies to said path; and
  adding said downscoped rule to said entry.

9. The method of claim 6, wherein:
  each element of said corpus of elements is a type of said element; and
  each path of said paths is qualified by a respective type of each element in the path.

10. The method of claim 6, wherein:
each element of said corpus of elements is a type of said element, wherein said type of said each element has one or more states, wherein the set of rules defined for each element are defined for a state of said one or more states;
wherein each path of said path is qualified by a respective type of each element in the path.

11. A method comprising:
executing a set of rules to determine whether a document is valid;
wherein the set of rules include calculations, said calculations being partitioned into stages based on dependencies between said calculations, said dependencies being based on paths of nodes in said document;
executing the calculations according to the stages;
after executing the calculations, executing other rules of said set of rules, wherein executing other rules of said set of rules includes, for each node of a plurality of nodes in said document, executing a subset of said other rules that are associated, based on the path of said each node, with said each node;
based on executing the rules to determine whether a document is valid, generating data indicating whether said document is valid.

12. The method of claim 11, wherein said set of rules are defined by a corpus of elements, wherein said document contains nodes that are instances of element of a corpus of elements.

13. One or more non-transitory storage media storing instructions which, when executed by one or more computing devices, cause performance of:
determining paths of nodes within a document, wherein each node of said nodes is an instance of an element of a corpus of elements, each element of said corpus of elements declaring a set of rules comprising at least one of:
one or more constraints that constrain descendant elements of said each element,
one or more calculations for target descendant elements of said each element,
wherein each path identifies a subset of one or more nodes of said nodes within said document;
for each path of said paths, collecting and storing, in association with said each path of said paths, rules for a particular element of which respective one or more nodes identified by said each path are an instance, said rules for the particular element including the set of rules declared by the particular element, said respective one or more nodes belonging to said nodes and said particular element belonging to said corpus of elements; and
validating the document based on rules collected by the collecting and storing for each path of said paths.

14. The one or more non-transitory storage media of claim 13, wherein:
each element of said corpus of elements is a type of said each element; and
each path of said paths is qualified by a respective type of each element in the path.

15. The one or more non-transitory storage media of claim 13, wherein:
each element of said corpus of elements is a type of said each element, wherein said type of said each element has one or more states, wherein the set of rules declared by said each element is defined for a state of said one or more states; and
wherein each path of said paths is qualified by a respective type of each element in the path.

16. The one or more non-transitory storage media of claim 13,
wherein the nodes include an ascendant node and a descendant node that is a descendant of the ascendant node;
wherein the ascendant node is an instance of a first element and is associated with a first path, wherein the descendant node is associated with a second path;
wherein the first element defines a downscoped rule; and
wherein collecting and storing, in association with said each path, rules defined for the element, includes collecting and storing, in association with said second path of said descendant node, said downscoped rule.

17. The one or more non-transitory storage media of claim 13,
wherein rules collected and stored in association with the paths include calculations;
wherein the instructions further include instructions for:
based on dependencies between the calculations, partitioning the calculations into stages, ordered from earlier to later, each stage of said stages containing a subset of one or more of said calculations; and
wherein for each stage of said stages, each calculation of said stage is not dependent on a calculation in said stage or in a later stage.

18. One or more non-transitory storage media storing instructions which, when executed by one or more computing devices, cause performance of:
traversing and visiting nodes within a document, wherein each node of said nodes is an instance of an element of a corpus of elements, each element of said corpus of elements declaring a set of rules comprising at least one of:
one or more constraints that constrain descendant elements of said each element,
one or more calculations for target descendant elements of said each element;
wherein visiting each node of said nodes comprises:
determining whether there is an entry for a path of said each node in a list of paths;
in response to determining that there is no entry for the path of said each node,
retrieving one or more rules declared by a respective element of which said node is an instance;
adding in association with said path an entry to the list of paths;
adding the one or more rules retrieved to the entry; and
validating the document based on the rules in said list of paths.

19. The one or more non-transitory storage media of claim 18, wherein visiting said each node includes, in response to determining that there is no entry for the path of said each node, adding to a list for downscoped rules a downscoped rule defined by said respective element.

20. The one or more non-transitory storage media of claim 18, wherein visiting said each node includes, in response to determining that there is no entry for the path of said each node:
determining that a list for downscoped rules includes a downscoped rule that applies to said path; and
adding said downscoped rule to said entry.

21. The one or more non-transitory storage media of claim 18, wherein:
each element of said corpus of elements is a type of said element; and
each path of said paths is qualified by a respective type of each element in the path.

22. The one or more non-transitory storage media of claim 18, wherein:

each element of said corpus of elements is a type of said element, wherein said type of said each element has one or more states, wherein the set of rules defined for each element are defined for a state of said one or more states;

wherein each path of said path is qualified by a respective type of each element in the path.

23. One or more non-transitory storage media storing instructions which, when executed by one or more computing devices, cause performance of:

executing a set of rules to determine whether a document is valid;

wherein the set of rules include calculations, said calculations being partitioned into stages based on dependencies between said calculations, said dependencies being based on paths of nodes in said document;

executing the calculations according to the stages;

after executing the calculations, executing other rules of said set of rules, wherein executing other rules of said set of rules includes, for each node of a plurality of nodes in said document, executing a subset of said other rules that are associated, based on the path of said each node, with said each node;

based on executing the rules to determine whether a document is valid, generating data indicating whether said document is valid.

24. The one or more non-transitory storage media of claim 23, wherein said set of rules are defined by a corpus of elements, wherein said document contains nodes that are instances of element of a corpus of elements.

* * * * *